US008528951B1

(12) United States Patent
Aberth

(10) Patent No.: US 8,528,951 B1
(45) Date of Patent: *Sep. 10, 2013

(54) FOLDING REACH EXTENDER

(71) Applicant: Karl R. Aberth, Bryan, TX (US)

(72) Inventor: Karl R. Aberth, Bryan, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/673,803

(22) Filed: Nov. 9, 2012

Related U.S. Application Data

(63) Continuation-in-part of application No. 12/911,871, filed on Oct. 26, 2010, now Pat. No. 8,328,256.

(51) Int. Cl.
*B25J 1/02* (2006.01)

(52) U.S. Cl.
USPC ........................................................ 294/119

(58) Field of Classification Search
USPC .................... 294/118, 119, 209, 210, 16, 106
See application file for complete search history.

(56) References Cited

U.S. PATENT DOCUMENTS

| | | | |
|---|---|---|---|
| 1,549,836 A | | 3/1924 | Hopp |
| 2,579,536 A | | 6/1950 | Barr |
| 3,112,135 A | | 11/1963 | Salomonson |
| 3,624,876 A | | 12/1971 | Irvin |
| 3,697,118 A | * | 10/1972 | Johnstone et al. .......... 294/110.1 |
| 4,169,622 A | * | 10/1979 | Claassen et al. ............... 294/118 |
| 5,152,569 A | * | 10/1992 | Guiboche ..................... 294/106 |
| 5,176,699 A | | 1/1993 | Markham |
| 5,795,004 A | | 8/1998 | Zimmerman |
| 8,328,256 B2 | * | 12/2012 | Aberth .......................... 294/119 |

* cited by examiner

*Primary Examiner* — Dean Kramer
(74) *Attorney, Agent, or Firm* — Buskop Law Group, PC; Wendy Buskop

(57) ABSTRACT

A tool to grasp objects, and to expand and/or retract while holding the objects, wherein the tool can include a pair of handles disposed on a first end of an expandable assembly, such as a scissor like assembly. The pair of handles can be adapted to expand the expandable assembly when they are moved towards one another and retract the expandable assembly when they are moved away from one another. A gear assembly can be disposed on a second end of the expandable assembly. The tool can allow users to reach, grasp, move, and release remote objects.

10 Claims, 11 Drawing Sheets

FOLDING REACH EXTENDER

CROSS REFERENCE TO RELATED APPLICATION

The current application is a Continuation in Part Application, which claims priority to co-pending U.S. patent application Ser. No. 12/911,871 filed on Oct. 26, 2010, entitled "FOLDING REACH EXTENDER." This reference is incorporated herein in its entirety.

FIELD

The present embodiments generally relate to a folding reach extender tool configured to grasp an object, and to expand and/or retract while holding the object.

BACKGROUND

A need exists for a tool to reach, grasp, move, and release remote objects that is extendable and retractable.

A need exists for a tool for reaching objects that is foldable and/or retractable for storage and transportation.

A further need exists for a single tool that can be used to reach objects that are disposed at various distances by adjusting an extension length of the tool.

The present embodiments meet these needs.

BRIEF DESCRIPTION OF THE DRAWINGS

The detailed description will be better understood in conjunction with the accompanying drawings as follows.

Figure 1:
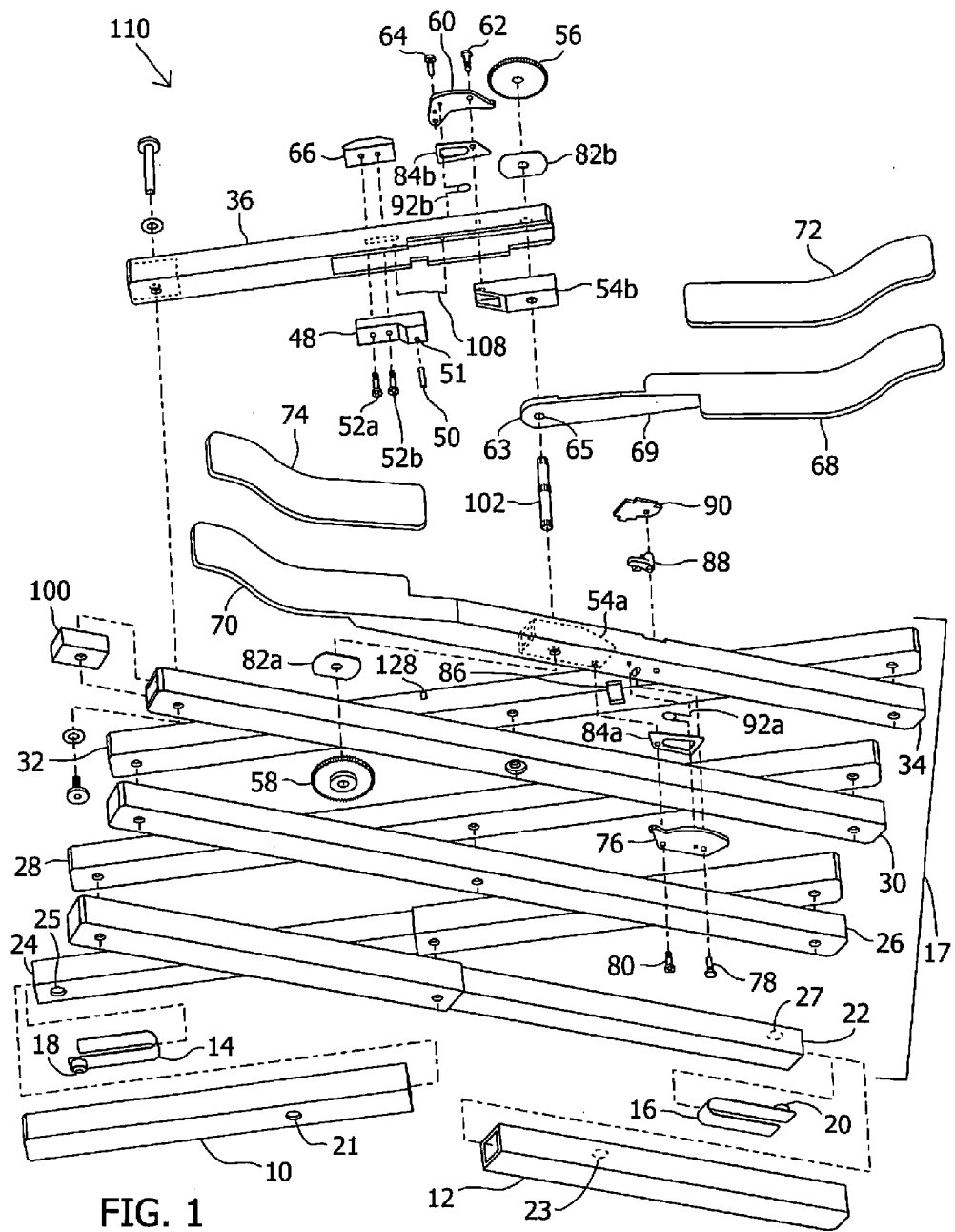
FIG. 1 depicts an exploded bottom front perspective view of the expandable tool.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a tool configured to grasp an object, either expand or retract while holding the object, and to release the object after the tool is expanded or retracted.

In one or more embodiments, the tool can include a pair of handles on a first end of an expandable assembly. The pair of handles can be adapted to expand the expandable assembly when they are moved toward one another and retract the expandable assembly when they are moved away from one another.

The tool can further have a first retaining arm that can move in a first direction towards a second retaining arm as the expandable assembly expands. The second retaining arm can be rigid and nonflexible, and the first retaining arm can be flexible and configured to bend and compress against objects to secure the objects between the retaining arms. In embodiments, both of the retaining arms can be flexible or rigid.

In one or more embodiments, the retaining arms can each include a magnet for holding metallic and magnetic objects. In one or more embodiments, each of the retaining arms can include a suction cup for engaging objects.

The expandable assembly can include an expandable body with a plurality of shafts.

A shaft can be connected to a handle of the pair of handles and an additional shaft can be connected to another handle of the pair of handles. Another shaft can be connected to the first retaining arm. The first retaining arm can be connected to another shaft using a portion of a gear assembly. Accordingly, at least a portion of the first retaining arm can move relative to the shaft connected thereto. For example, the first retaining arm can be pinned to the shaft and the pinned connection can allow rotation of the first retaining arm relative to the shaft connected thereto.

In addition, a top shaft can be connected to the second retaining arm. Each of the plurality of shafts can be at least connected at one end to one of the shafts within the plurality of shafts.

The tool can also include a gear assembly adjacent to a second end of the expandable assembly. For example, at least a portion of the gear assembly can be connected to a portion of the second end of the expandable assembly using a shaft or another pin.

The gear assembly can be configured to allow the first retaining arm to move in a first direction towards the second retaining arm as the expandable assembly expands. The gear assembly can also be configured to secure the first retaining arm in a locked position when the expandable assembly is retracted, thereby securing an object.

The gear assembly can include a first gear in selective contact with a release ratchet. When the first gear is in contact with the release ratchet, the first retaining arm can be allowed to move toward the second retaining arm and prevented from moving away from the second retaining arm. This can be accomplished by the arrangement of teeth on the release ratchet and teeth on the first gear. For example, the teeth on the release ratchet can be configured to allow the teeth on the first gear to pass by without engagement as the first gear moves in the first direction as the expandable assembly expands, and the teeth on the release ratchet can engage the teeth on the first gear as the expandable assembly retracts. As such, the engagement of the teeth on the release ratchet and the teeth on the first gear can prevent the first retaining arm from moving away from the second retaining arm as the expandable assembly retracts.

The gear assembly can include a second gear in selective contact with a drive ratchet. When the second gear is in contact with the drive ratchet, the second gear can move the first retaining arm towards the second retaining arm, but can be prevented from moving the first retaining arm away from the second retaining arm. This can be accomplished by the arrangement of teeth on the drive ratchet and teeth on the second gear. That is, the teeth on the drive ratchet can engage the teeth on the second gear as the expandable assembly expands, and the teeth on the drive ratchet can allow the teeth on the second gear to pass by as the expandable assembly retracts.

The tool can also include a switch pin adapted to move the release ratchet when the expandable assembly is at least partially expanded. For example, the switch pin can engage a swivel that can contact a disengagement pin in the release ratchet, thus moving the release ratchet away from the first gear.

The gear assembly can include a gear shaft at least partially disposed through a portion of the second end of the expandable assembly. The gear shaft can be engaged with the first gear, second gear, and first retaining arm. The first gear, second gear, first retaining arm, and the gear shaft can be static relative to one another.

The tool can include a switch having a first switch position and a second switch position. The switch can be configured to keep the drive ratchet away from the second gear and to engage the release ratchet when the expandable assembly is at least partially expanded. For example, the switch can be configured to keep the drive ratchet away from the second gear and to engage the release ratchet by contacting the swivel when the expandable assembly is fully expanded or near fully expanded.

The tool can include one or more spring locks. A first spring lock can be disposed within one of the shafts connected to one of the handles of the pair of handles, and a second spring lock can be disposed within another shaft connected to the other handle of the pair of handles.

The tool can be used with a method of retrieving a remote object.

The method can include moving a pair of handles on a first end of an expandable assembly toward one another and expanding the expandable assembly.

As the expandable assembly is expanded, one of the retaining arms can move towards the other retaining arm using the gear assembly.

The method can include expanding the expandable assembly until a remote object is located between the retaining arms and closing the retaining arms, using the gear assembly, about the remote object.

The method can include retracting the expandable assembly and maintaining the retaining arms in a locked position using the gear assembly. The method can include releasing the object when the expandable assembly is retracted.

The method can also include expanding the expandable assembly, maintaining the retaining arms in a locked position using the gear assembly, and releasing the object when the expandable assembly is fully expanded or near fully expanded.

In one or more embodiments, the tool can be sold as a kit with a carrying device. The carrying device can be configured to be secured to a portion of a user, such as a waist of the user, or a portion of the user's clothing, such as a belt or a pocket, or combinations thereof. The carrying device can be configured to secure to a wheel chair or another transportation device by means such as a strap inserted through a hole or belt loop on the carrying device. The carrying device can be a hard case or a soft case such as a pouch made of leather or another material.

The tool can also be used to perform a method of placing an object at a desired location. The method can include moving a first retaining arm towards a second retaining arm to secure an object there between.

The method can also include locking the first retaining arm in position using a gear assembly to maintain the object between the retaining arms, and moving a pair of handles on a first end of an expandable assembly towards one another to expand the expandable assembly.

The method can also include expanding the expandable assembly until the object is at a desired location, and releasing the first retaining arm by moving a release ratchet away from the gear assembly.

The method can conclude by disposing the object at the desired location.

Turning now to the Figures, FIG. 1 depicts an exploded bottom front perspective view of the expandable tool.

Figure 2:
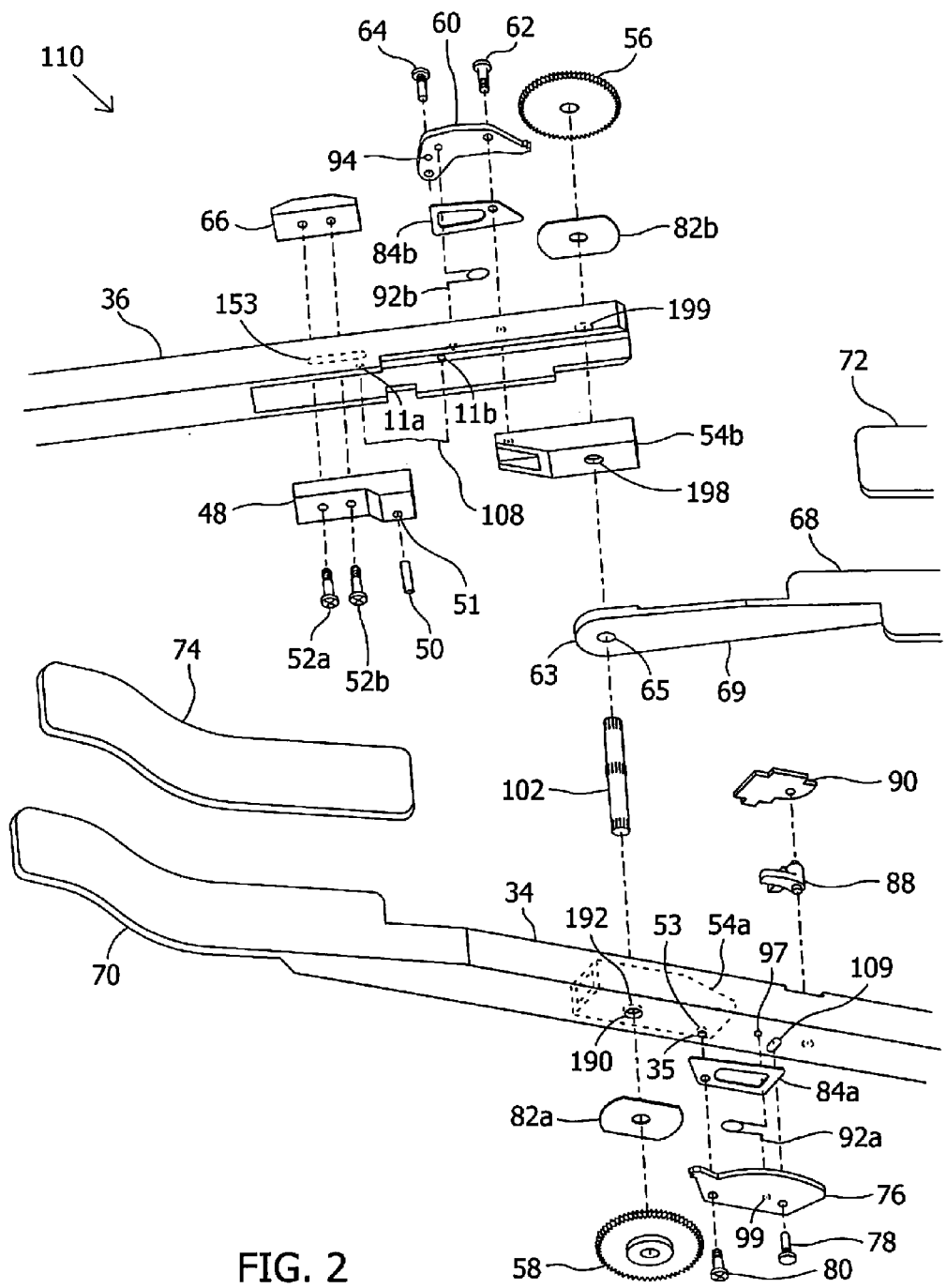
FIG. 2 depicts a portion of an exploded bottom front perspective view of the tool shown in FIG. 1.

FIG. 2 depicts a portion of an exploded bottom front perspective view of the expandable tool shown in FIG. 1.

Referring now to FIGS. 1 and 2, the tool 110 can include an expandable assembly 17, a first handle 10, a second handle 12, a first spring lock 14, a second spring lock 16, a first gear 58, a second gear 56, a first retaining arm 68, a release ratchet 76, a second retaining arm 70, and a drive ratchet 60.

The expandable assembly 17 can include a first shaft 22, a second shaft 24, a third shaft 26, a fourth shaft 28, a fifth shaft 30, a sixth shaft 32, a seventh shaft 34, and an eighth shaft 36. The shafts 22, 24, 26, 28, 30, 32, 34, and 36 can be one-piece shafts or can each include a first portion concentrically aligned with a second portion. In one or more embodiments, the shafts 22, 24, 26, 28, 30, 32, 34, and 36 can be hollow. One or more of the shafts 22, 24, 26, 28, 30, 32, 34, and 36 can have a bushing disposed within at least a portion thereof. In one or more embodiments, the bushings 100 can be made of square steel tubing. The bushings 100 can be engaged at each end-to-end and center-to-center connection between the shafts.

One or more pins, fasteners, rivets, bolts, screws, welds, or other fastening means can be used to connect the shafts to one another at the ends and the centers thereof.

The shafts, as well as other portions of the tool 110, can be made of carbon fiber, fiber reinforced plastic, aluminum, a lightweight rigid material, or combinations thereof. The length and size of the shafts can vary according to a desired stability and user preference. In one or more embodiments, each shaft can be ⅜ inch square tubing with a length of about 10½ inches. The shafts can be fastened end-to-end and center-to-center in a crossing pattern using a variety of hardware. For example, the shafts can be configured in a scissor lift assembly like configuration. The center-to-center connections between the fifth shaft 30 and the sixth shaft 32 can be flush mounted to prevent any contact between any connection hardware and the gears 56 and 58.

In one or more embodiments, the shafts 22, 24, 26, 28, 30, 32, 34, and 36 can be square tubing, rectangular tubing, C-channel, or another shape of tubing. The C-channel can have three sides and can have a square or rectangular shape. The C-channel can be molded or constructed with solid ends and a solid center portion surrounding moving components of the tool 110, fasteners of the tool 110, and connecting members of the tool 110. The C-channel can provide for easy assembly of the tool 110 and can eliminate the need for the bushings 100, the first backing member 54a, and the second backing member 54b. In one or more embodiments, the first handle 10, the second handle 12, the first shaft 22, and the second shaft 24 can be made of thicker tubing than that of the shafts 26, 28, 30, 32, 34, and 36, providing easy to grasp handles and additional strength at stress points.

The first shaft 22 can be connected to the second shaft 24. For example, a central portion of the first shaft 22 can be connected to a central portion of the second shaft 24. A portion of the first shaft 22 can also be connected to a portion of the fourth shaft 28. For example, an end portion of the first shaft 22 can be connected to an end portion of the fourth shaft 28.

The second shaft 24 can be connected at a portion thereof to a portion of the third shaft 26. For example, an end portion of the second shaft 24 can be connected to an end portion of the third shaft 26.

A portion of the third shaft 26 can be connected to a portion of the fourth shaft 28 and to a portion of the sixth shaft 32. For example, a central portion of the third shaft 26 can be connected to a central portion of the fourth shaft 28, and an end portion of the third shaft 26 can be connected to an end portion of the sixth shaft 32.

A portion of the fourth shaft 28 can be connected to a portion of the fifth shaft 30. For example, an end portion of the fourth shaft 28 can be connected to an end portion of the fifth shaft 30.

The fifth shaft 30 can additionally be connected to a portion of the sixth shaft 32 and a portion of the eighth shaft 36. For example, an end portion of the fifth shaft 30 can be connected to an end portion of the eighth shaft 36, and a central portion of fifth shaft 30 can be connected to a central portion of the sixth shaft 32.

The sixth shaft 32 can be connected to a portion of the seventh shaft 34. For example, an end portion of the sixth shaft 32 can be connected to an end portion of the seventh shaft 34.

The seventh shaft 34 can have the second retaining arm 70 on an end thereof. For example, the second retaining arm 70 can be connected to an end portion of the seventh shaft 34 that is opposite the end portion of the seventh shaft 34 connected to the sixth shaft 32. A second grip 74 can be on a portion of the second retaining arm 70. The second grip 74 can be a tacky, rough, or another surface configured to increase friction between a griped object and the second retaining arm 70. In addition, the second grip 74 can be a synthetic or natural polymer.

The seventh shaft 34 can be configured to connect to the release ratchet 76. The release ratchet 76 can include one or more teeth, such as two teeth, configured to selectively engage the first gear 58. For example, the release ratchet 76 can be in contact with the first gear 58 until the release ratchet 76 is pushed on its outer curved edge thereby releasing the first retaining arm 68 and any object held therein.

The release ratchet 76 can be secured to the seventh shaft 34 using the first backing member 54a. The first backing member 54a can have a mounting hole 53 aligned with a seventh shaft mounting hole 35 in the seventh shaft 34. A mounting fastener 80 can be disposed through the mounting hole 53, the seventh shaft mounting hole 35, the release ratchet 76, and a first antifriction spacer 84a disposed between the release ratchet 76 and the seventh shaft 34 to secure the release ratchet 76 to the seventh shaft 34.

A first spring 92a can be beneath the release ratchet 76 within a hollow of the first antifriction spacer 84a. The first spring 92a can be secured within two mounting holes, such as the first spring first mounting hole 97 in the seventh shaft 34 and the first spring second mounting hole 99 in the release ratchet 76. The first spring 92a can be used to keep the release ratchet 76 in a first position. When the release ratchet 76 is in the first position, the teeth of the release ratchet 76 can engage the first gear 58 and can prevent bi-directional movement of the first gear 58. A first disengagement pin 78 can be disposed through the release ratchet 76 and through a first oval slot 109 in the seventh shaft 34. The first disengagement pin 78 can be configured to oppose the first spring 92a and to cause the release ratchet 76 to move to a second position. In one or more embodiments, the first spring 92a can be adjacent the first disengagement pin 78. The first spring 92a can maintain the first disengagement pin 78 and the release ratchet 76 in the first position when pressure is not applied to the first spring 92a by a user or another portion of the tool 110. The first spring 92a can be any spring.

The seventh shaft 34 can also include a swivel 88 and a retainer plate 90. The swivel 88 can have one or more protrusions that can be selectively aligned with the first disengagement pin 78 and can move the first disengagement pin 78 to move the release ratchet 76. The retainer plate 90 can be configured to secure the swivel 88 to the seventh shaft 34. The retainer plate 90 can be configured to allow the swivel 88 to contact the first disengagement pin 78 when the swivel 88 has an external force applied thereto. The external force can be applied by a switch pin 50 when the tool 110 is at least partially expanded.

A first notch 86 can be disposed in the seventh shaft 34. The first notch 86 can be adjacent to the swivel 88. The first notch 86 can prevent a portion of the tool 110 from contacting the swivel 88 as the tool 110 is retracted.

A gear shaft 102 can have a first end that can be disposed through a gear shaft hole 192 formed through the first backing member 54a and a seventh shaft gear shaft hole 190 formed through the seventh shaft 34. The first end of the gear shaft 102 can connect to the first gear 58. A first spacer 82a can be disposed between the first gear 58 and the seventh shaft 34. The first spacer 82a can be a low friction material. For example, the first spacer 82a can be made from nylon or another low friction material. A midsection of the gear shaft 102 can be at least partially disposed through a gear shaft mounting hole 65 on a flat section 69 of the first retaining arm 68. The first retaining arm 68 can have a first grip 72 located thereon. The first grip 72 can be substantially similar to the second grip 74. The gear shaft 102 can be pressed into the gear shaft mounting hole 65 creating a solid bond therewith. The seventh shaft 34 and the eighth shaft 36, along with the first spacer 82a and a second spacer 82b, can be positioned over the gear shaft 102 on either side of the first retaining arm 68, and can be held in place by the first gear 58 and the second gear 56. The first gear 58 and the second gear 56 can be pressed onto opposing ends of the gear shaft 102.

In one or more embodiments, the flat section 69 can have a rounded end 63. In embodiments, the gear shaft mounting hole 65 can be disposed through any portion of the first retaining arm 68.

The second end of the gear shaft 102 can also be disposed through a second gear shaft hole 198 formed through the second backing member 54b, and an eighth shaft second gear shaft hole 199 formed through the eighth shaft 36. The second end of the gear shaft 102 can be disposed through the second spacer 82b and connected to the second gear 56.

The second gear 56 can have one or more teeth. The teeth of the second gear 56 can be selectively engaged with one or more teeth on the drive ratchet 60.

The eighth shaft 36 can be configured to connect to one or more devices for actuating the drive ratchet 60, the release ratchet 76, or both. For example, the eighth shaft 36 can connect to a carriage block 48, the switch pin 50, a switch spring 108, and a selector switch 66.

The carriage block 48, which can have a rectangular shape or another shape, can be mounted within the eighth shaft 36. One end of the carriage block 48 can carry the switch pin 50.

The switch pin 50 can be located in a switch pin mounting hole 51 at an edge of the carriage block 48. The switch pin 50 can extend upwards from the carriage block 48 and can be contained within the eighth shaft 36.

The selector switch 66, which can have a rectangular shape with tapered ends or another shape, can be attached to the carriage block 48, such as by the fasteners 52a and 52b. The fasteners 52a and 52b can pass through a second oval slot 153 in the eighth shaft 36. The selector switch 66 and the carriage block 48 can be connected through the second oval slot 153. The second oval slot 153, in combination with the fasteners 52a and 52b, can create stopping points to stop the movement of the selector switch 66 and the carriage block 48.

The switch spring 108 can be used to keep force on the carriage block 48 to maintain the carriage block 48 in a first position or a second position. The switch spring 108 can have one or more curves, bumps, extensions, or combinations thereof for ensuring that the selector switch 66 remains in a selected position and to lock the drive ratchet 60 in a position away from the second gear 56. When the selector switch 66 is in the first switch position, the drive ratchet 60 can be in contact with the second gear 56 unless the tool 110 is fully retracted. The drive ratchet 60 can be secured in a position away from the second gear 56 when the selector switch 66 is moved to a second switch position while the tool 110 is fully retracted.

The switch spring 108, which can have two downward facing ends, can be mounted to an inner surface of the eighth shaft 36 and secured within a first switch spring mounting hole 11a and a second switch spring mounting hole 11b therein. In one or more embodiments, a groove can be disposed within the inner surface of the eighth shaft 36 between the two switch spring mounting holes 11a and 11b, allowing the switch spring 108 to lie flush on the inner surface of the eighth shaft 36. This configuration can allow the carriage block 48 to move freely over the switch spring 108.

As the carriage block 48 travels over the switch spring 108, the carriage block 48 can move the switch spring 108 at least partially through one of the switch spring mounting holes, such as the second switch spring mounting hole 11b, and into a locking hole 94 formed into a portion of the drive ratchet 60. For example, as the carriage block 48 is moved over the switch spring 108, the switch spring 108 can be moved through the second switch spring mounting hole 11b and engaged with the locking hole 94, thereby locking the drive ratchet 60 in a position away from the second gear 56. Accordingly, an object proximate to a user can be secured between the two retaining arms 68 and 70 and the expandable assembly 17 can be expanded; upon full expansion or at least near full expansion of the expandable assembly 17, the switch pin 50 can contact the swivel 88 to move the release ratchet 76 by pushing the first disengagement pin 78, allowing the object to be released. The first switch spring mounting hole 11a can be used to mount the switch spring 108.

When the selector switch 66 is in the second position, the switch spring 108 can engage the drive ratchet 60, a second spring 92b, or combinations thereof to lock the drive ratchet 60 in a position away from the second gear 56.

Furthermore, the selector switch 66 can be located on the eighth shaft 36 and attached to the carriage block 48. The selector switch 66 can be configured to move along the eighth shaft 36, thereby moving the carriage block 48 and the switch pin 50. When the expandable assembly 17 is expanded, the selector switch 66, when in a second switch position, can be configured to position the switch pin 50 to engage the swivel 88, which in-turn engages the first disengagement pin 78 to move the release ratchet 76 away from the first gear 58 and to release objects from the first retaining arm 68 and the second retaining arm 70. The carriage block 48 can be configured to move along the switch spring 108 within the eighth shaft 36 as the selector switch 66 moves.

The drive ratchet 60 can have a second disengagement pin 64 that can move a portion of the drive ratchet 60 away from the second gear 56 when the tool 110 is fully retracted. In operation, the second disengagement pin 64 can be contacted by the sixth shaft 32, thereby disengaging the drive ratchet 60 from the second gear 56. The drive ratchet 60 can be secured to the eighth shaft 36 with a shoulder screw 62 or another fastener. A second antifriction spacer 84b can be disposed between the drive ratchet 60 and the eighth shaft 36. As such, the drive ratchet 60 can be locked into a position away from the second gear 56 when the switch spring 108 is located in the locking hole 94.

A second notch 128 can be formed in the sixth shaft 32 and can receive the second disengagement pin 64 when the expandable assembly 17 is fully retracted.

The first handle 10 can be at least partially disposed about a portion of the second shaft 24. The first spring lock 14 can be disposed within the second shaft 24. The second shaft 24 can have a first hole 25 for allowing a first spring lock protrusion 18 to extend from the second shaft 24. The first spring lock protrusion 18 can selectively engage a first lock hole 21 formed into the first handle 10. As such, the first spring lock protrusion 18 can secure the first handle 10 in place when engaged with the first lock hole 21 formed in the first handle 10. The first spring lock protrusion 18 can be pushed inwards to allow the first handle 10 to move about the second shaft 24.

The second handle 12 can be at least partially disposed about the first shaft 22. The second spring lock 16 can be disposed within the first shaft 22. The first shaft 22 can have a second hole 27 allowing a second spring lock protrusion 20 to selectively engage a second lock hole 23, which can be formed in the second handle 12.

Figure 3:
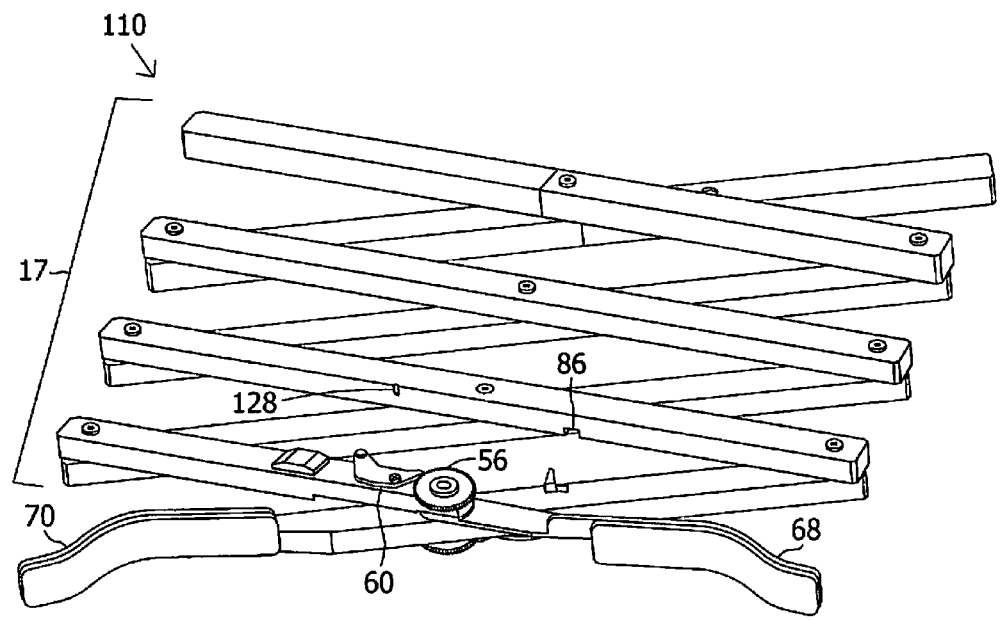
FIG. 3 depicts a top front perspective view of the tool in a partially extended position.

FIG. 3 depicts a top front perspective view of the tool 110 in a partially extended position.

Figure 4:
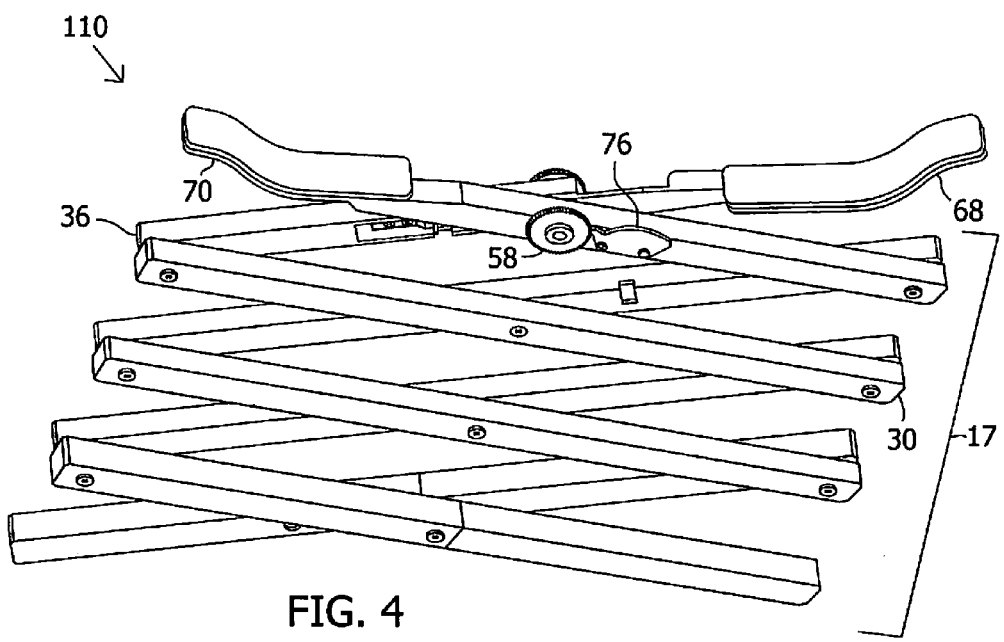
FIG. 4 depicts a bottom front perspective view of the tool in a partially extended position.

FIG. 4 depicts a bottom front perspective view of the tool 110 in a partially extended position.

Referring to FIGS. 3 and 4, as the expandable assembly 17 expands, the second retaining arm 70 and the first retaining arm 68 can move towards one another. In one or more embodiments, the second retaining arm 70 can be rigid and nonflexible, and the first retaining arm 68 can be flexible and configured to bend and compress against objects to secure the objects. The first retaining arm 68 can be configured to flexibly engage objects, and the second retaining arm 70 can be configured to statically engage objects. The nonflexible rigidity of the second retaining arm 70 can prevent the second retaining arm 70 from contacting the fifth shaft 30 and the eighth shaft 36 when the tool 110 is fully retracted while holding an object. The flexibility of the first retaining arm 68 can allow the first retaining arm 68 to bend and be compressed against objects until forward motion of the tool 110 ceases. As soon as the direction of the tool 110 is reversed and the tool 110 begins to retract, the first retaining arm 68 can be locked in place while holding the tension of the compressed first retaining arm 68, thereby securing the object.

Figure 5:
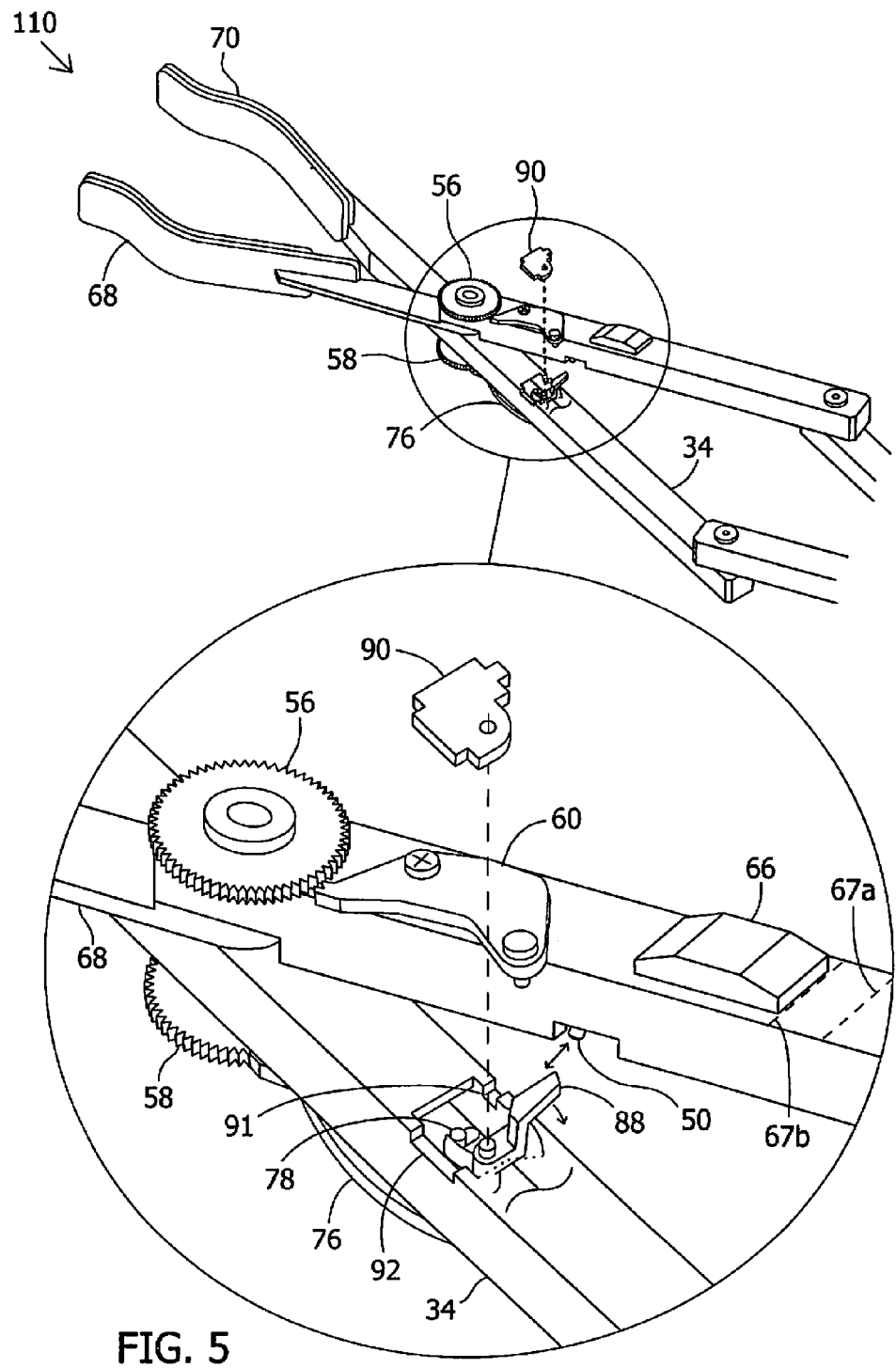
FIG. 5 depicts an enlarged top perspective view of the tool showing the interaction between the various components used to engage and disengage one or more spur gears of the tool.

FIG. 5 depicts an enlarged top perspective view of the tool 110 showing the interaction between the various components used to engage and disengage one or more spur gears of the tool 110.

The selector switch 66 can have a first switch position 67a and a second switch position 67b. The selector switch 66 is shown in the second switch position 67b. The selector switch 66 can be configured to keep the drive ratchet 60 away from the second gear 56 and to move the switch pin 50. For example, with the selector switch 66 in the second switch position 67b, the switch pin 50 can be disposed in an actuated position, such that when the expandable assembly is fully expanded, or near fully expanded, the switch pin 50 can contact the swivel 88, which can cause the swivel 88 to contact the first disengagement pin 78. The first disengagement pin 78 can thereby move and cause the release ratchet 76 to move away from the first gear 58. When the release ratchet 76 is away from the first gear 58 and the drive ratchet 60 is held away from the second gear 56 by the selector switch 66, the first retaining arm 68 can pivot away from the second retaining arm 70, which allows the object to be released from the retaining arms 68 and 70. The arrows shown proximate the switch pin 50 and the swivel 88 show the directional movement of the switch pin 50 and the swivel 88 upon expansion of the tool 110.

Two opposing protrusions or pins of the swivel 88 can be used for mounting the swivel 88 in the seventh shaft 34 and the retainer plate 90, and can also allow for a slight reciprocating rotation of the swivel 88. The reciprocating rotation of the swivel 88 can be used to push a tip of the first disengagement pin 78 to move the release ratchet 76. The retainer plate 90 can sit in the first retainer notch 91 and the second retainer notch 92 formed in the seventh shaft 34.

Figure 6:
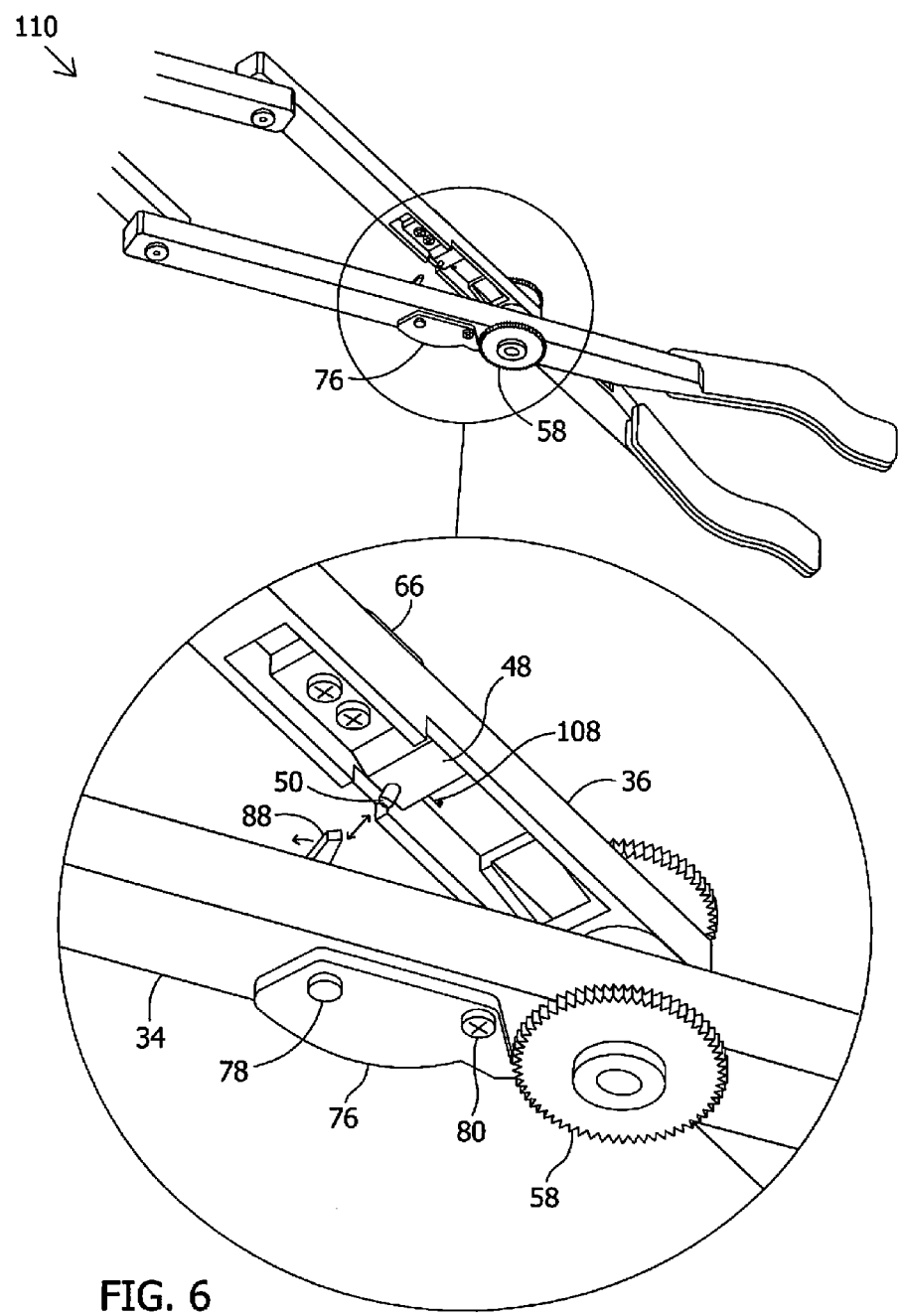
FIG. 6 depicts an enlarged bottom perspective view of the tool showing the interaction between the various components used to engage and disengage one or more spur gears.

FIG. 6 depicts an enlarged bottom perspective view of the tool 110 showing the interaction between the various components used to engage and disengage one or more spur gears.

The release ratchet 76 is depicted contacting the first gear 58. The switch pin 50 is shown in proximity to the swivel 88. The carriage block 48 is shown engaged over the switch spring 108 due to the selector switch 66 being in the second position.

Figure 7:
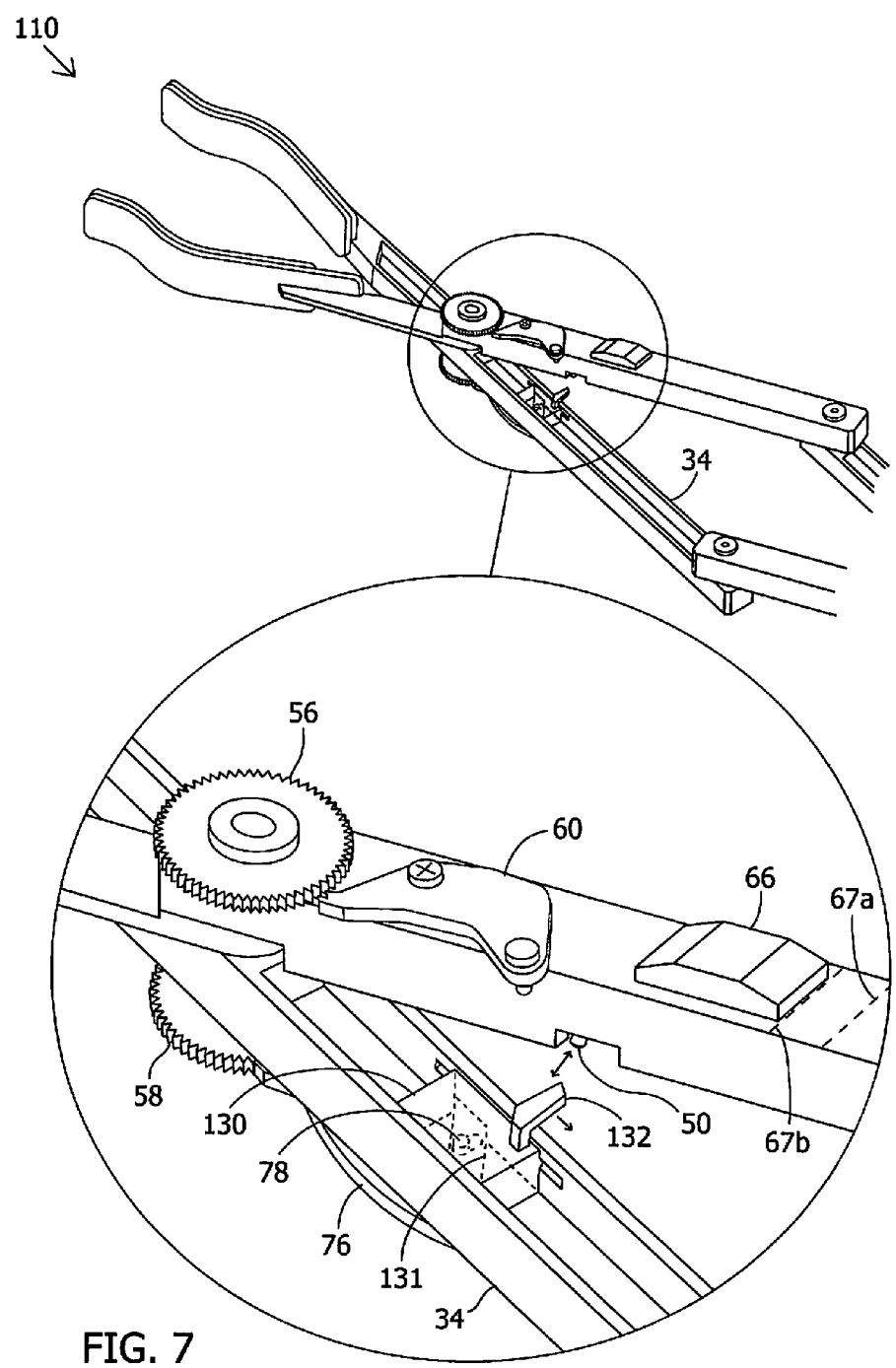
FIG. 7 depicts an enlarged top perspective view of the tool showing an embodiment of a device usable to move the release ratchet of the tool.

FIG. 7 depicts an enlarged top perspective view of the tool 110 showing an embodiment of a device usable to move a release ratchet of the tool 110.

The tool 110 can include a slide block 130 engaged within the seventh shaft 34, such as within a bottom side of the seventh shaft 34. The slide block 130 can be configured to engage the first disengagement pin 78. The slide block 130 can be a rectangular block and can include a slot or a recessed portion.

The recessed portion 131 can be a diagonal cut out on a bottom surface of the slide block 130. Accordingly, the slide block 130 can move within the seventh shaft 34 and the slide block 130 can actuate the first disengagement pin 78 to move the release ratchet 76 away from the first gear 58.

In operation, the selector switch 66 can be moved from a first switch position 67a to a second switch position 67b to move the switch pin 50 and to hold the drive ratchet 60 away from the second gear 56. As the tool 110 is expanded, the switch pin 50 can engage a protruding arm or contact arm 132 of the slide block 130. The contact arm 132 can protrude outward from a mounting hole in the slide block 130 and extend from the seventh shaft 34. Once engaged by the switch pin 50, the slide block 130 can engage a portion of the first disengagement pin 78. For example, the recessed portion 131 of the slide block 130 can engage the first disengagement pin 78, thereby moving the release ratchet 76 away from the first gear 58.

In one or more embodiments, the seventh shaft 34 can include grooves within which the slide block 130 can be engaged. For example, the slide block 130 can have one or more protruding ridges that can engage one or more grooves within the seventh shaft 34. The slide block 130 can snap in place and move freely within the seventh shaft 34. In this embodiment, the swivel and the retainer plate can be removed from the seventh shaft 34.

Figure 8:
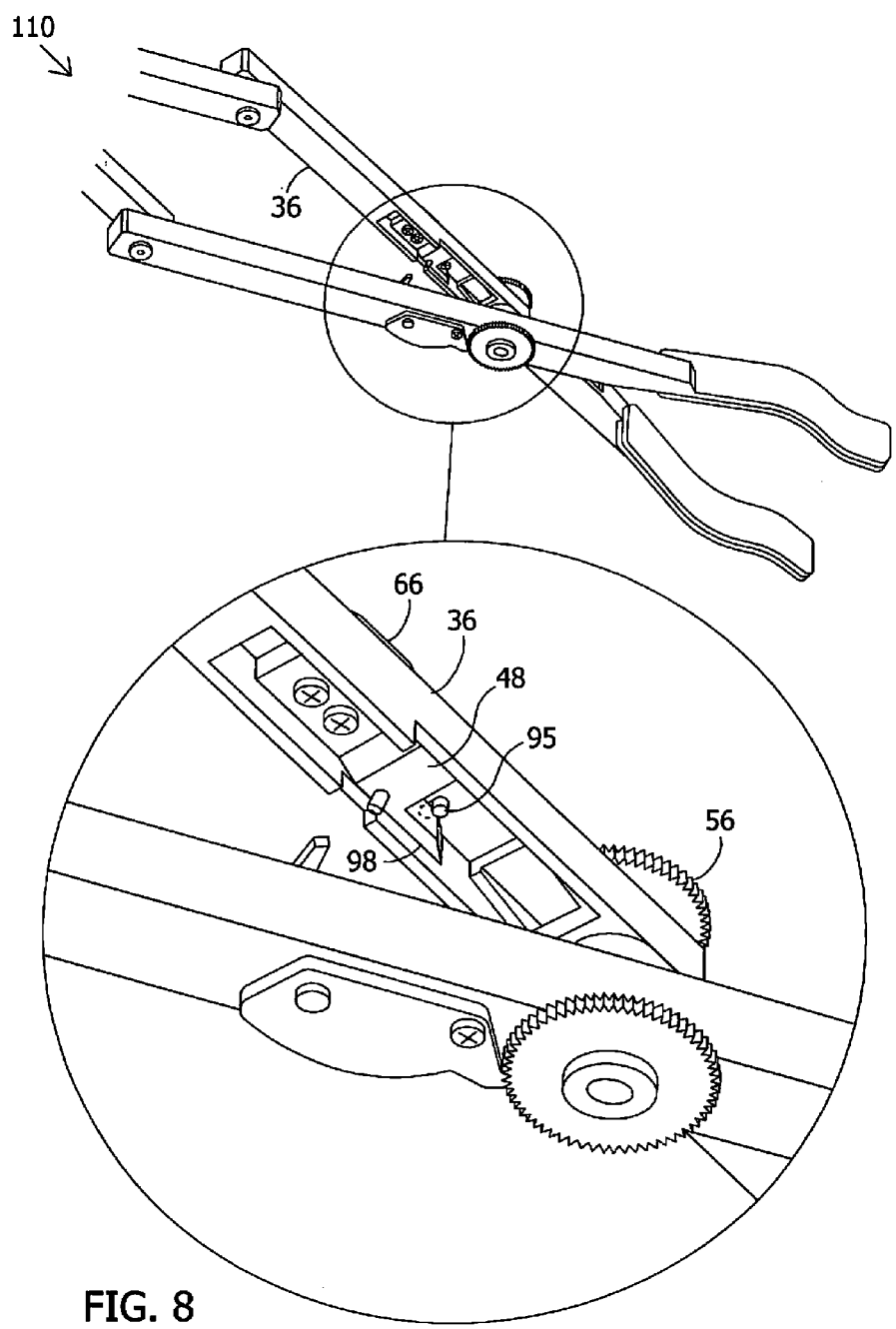
FIG. 8 depicts an enlarged bottom perspective view of an embodiment with components usable to move the drive ratchet away from the second gear of the tool.

FIG. 8 depicts an enlarged bottom perspective view of the tool 110 with embodiments of one or more devices usable to move the drive ratchet away from the second gear 56.

A wedge 98 can be on the carriage block 48. The wedge 98 can be configured to engage an additional disengagement pin 95 disposed through the drive ratchet and the eighth shaft 36. When the selector switch 66 is moved to the second switch position, the wedge 98 can engage the additional disengagement pin 95, and the drive ratchet can be moved away from the second gear 56. In this embodiment, the switch spring can be removed from the eighth shaft 36.

FIGS. 9A-9E depict an embodiment of the tool 110 at various positions during operation of the tool 110.

Figure 9A:
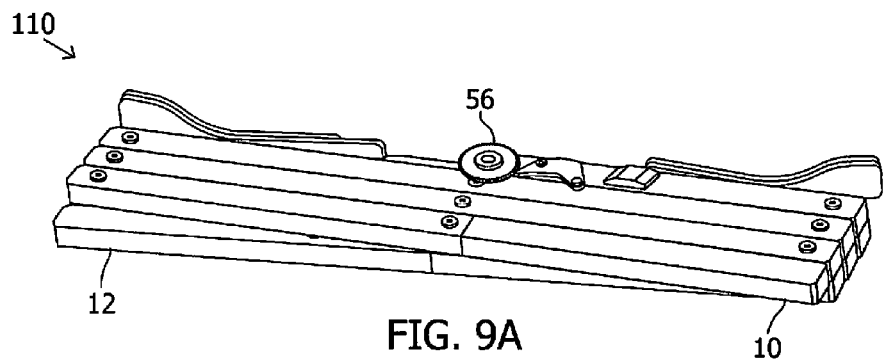
FIGS. 9A-9E depict an embodiment of the tool at various positions during operation of the tool.

In FIG. 9A, the tool 110 is depicted in a retracted position with the first handle 10 and the second handle 12 in a retracted position.

Figure 9B:
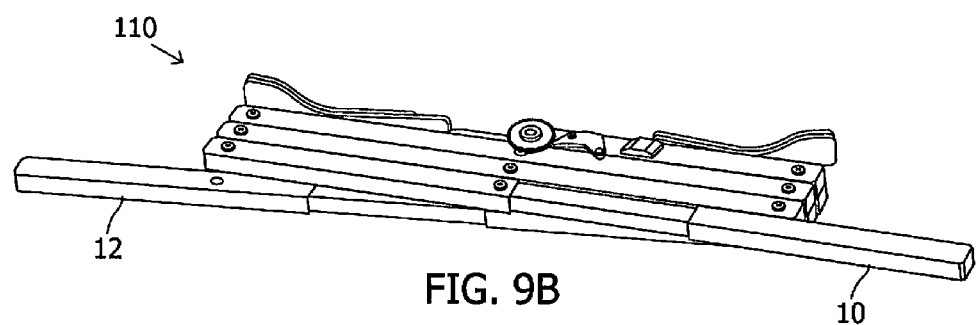

In FIG. 9B, the tool 110 is depicted with the first handle 10 and the second handle 12 in an expanded position. The tool 110 can be operated with the first handle 10 and the second handle 12 in an expanded or retracted position.

Figure 9C:
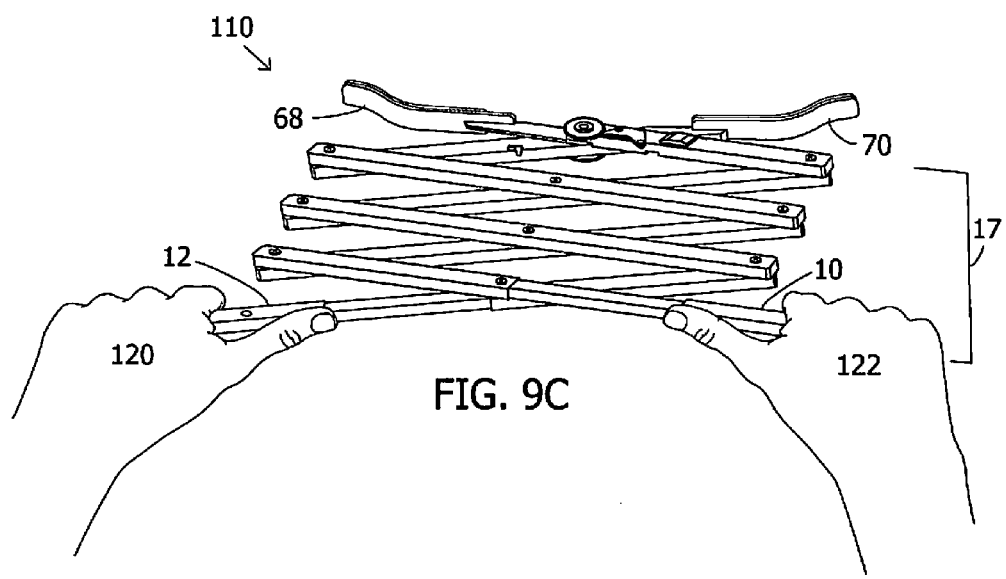

In FIG. 9C, a first hand 120 and a second hand 122 of a user are depicted pushing the first handle 10 and the second handle 12 towards one another, which expands the expandable assembly 17. As the expandable assembly 17 is expanded, the first retaining arm 68 can be moved toward the second retaining arm 70.

Figure 9D:
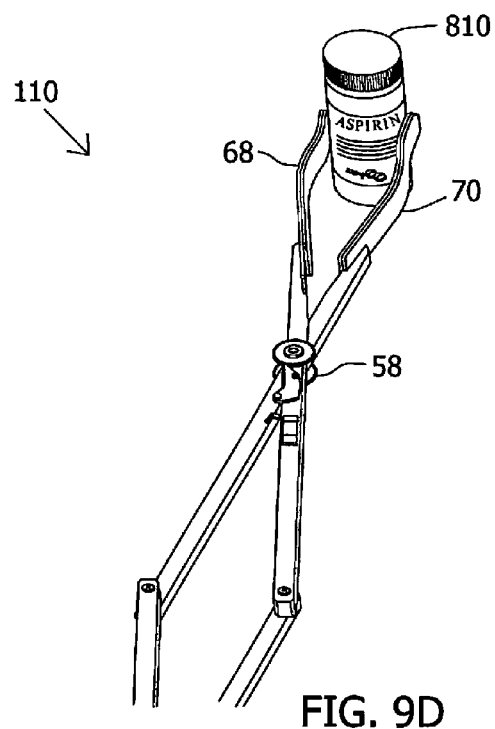

FIG. 9D depicts the tool 110 in an expanded position with the first retaining arm 68 and the second retaining arm 70 applying a pressure to an object 810. As the first retaining arm 68 and the second retaining arm 70 apply the pressure to the object 810, the object 810 can be held between the retaining arms 68 and 70. The first retaining arm 68 can be locked in position by the release ratchet and the first gear 58.

Figure 9E:
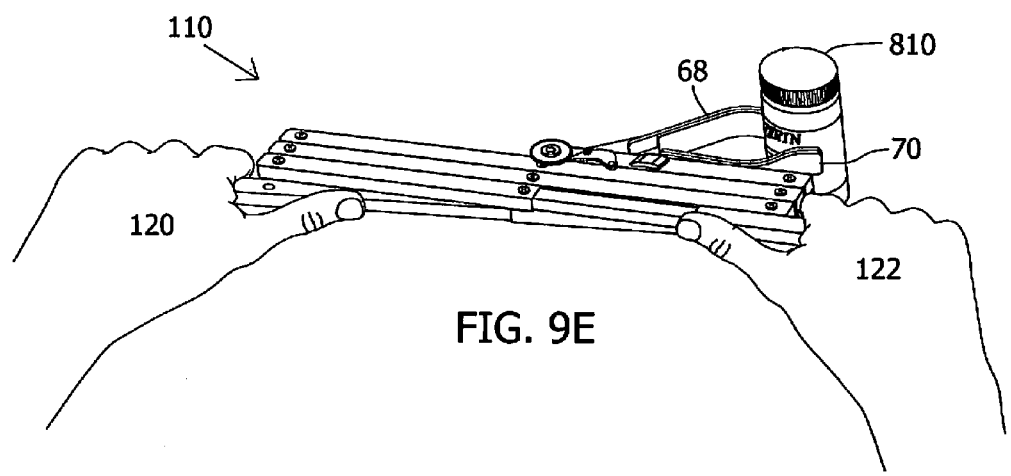

In FIG. 9E, the tool 110 is depicted in a retracted position. Once the tool 110 is in the retracted position, the first retaining arm 68 can be freed to move by pushing the release ratchet on its curved edge. As such, the object 810 can be released by the first retaining arm 68 and the second retaining arm 70.

Figure 10:
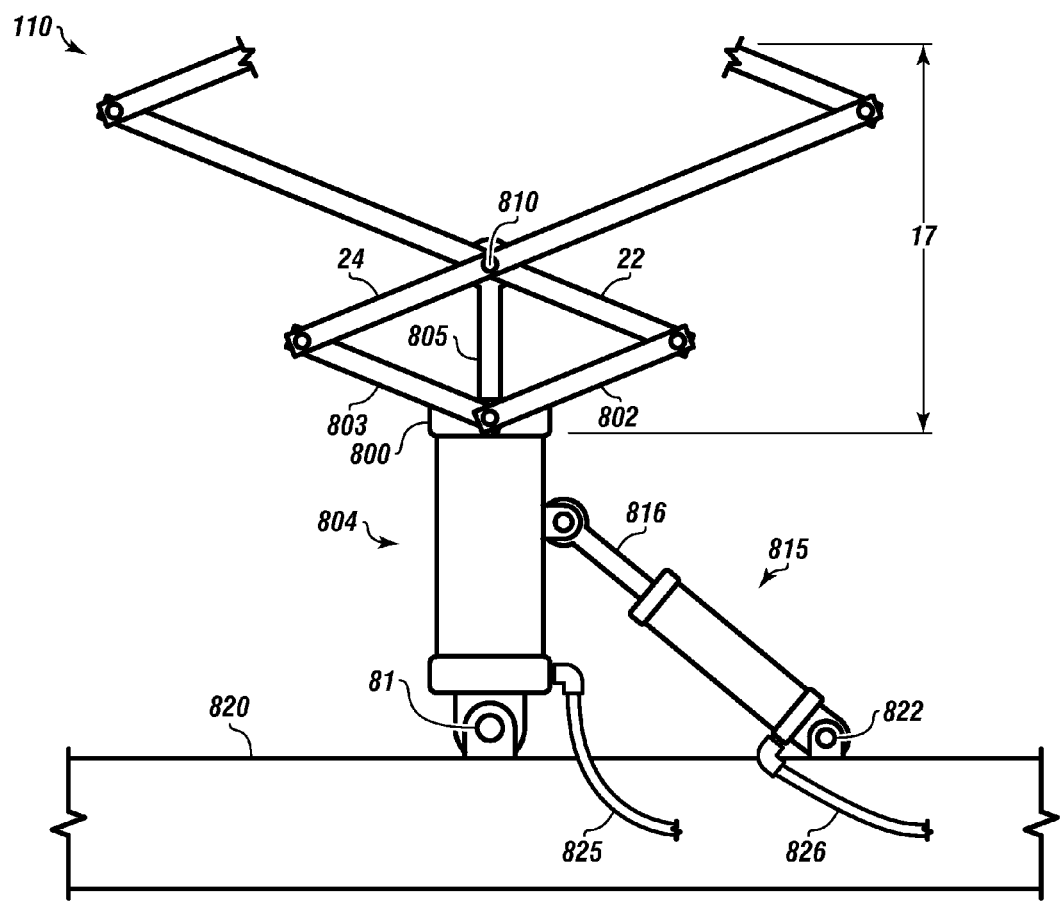
FIG. 10 depicts an embodiment of the tool that is hydraulically operated.

FIG. 10 depicts an embodiment of the tool 110 that is operated hydraulically.

The expandable assembly 17 can have the first shaft 22 connected to a first adapter shaft 802 and the second shaft 24 connected with a second adapter shaft 803.

The adapter shafts 802 and 803 can be pinned to a housing 800 of a first actuator 804.

The first actuator 804 can be in communication with a power system via a first communication line 825. A first rod 805 of the first actuator 804 can be connected at the intersection point 810 of the first shaft 22 and the second shaft 24.

The first actuator 804 can be a hydraulic actuator, a solenoid, a pneumatic actuator, or the like. The power system can be an electric power source, a pneumatic system, a hydraulic system, or the like. The first communication line 825 can be a hydraulic line, an electric conductor, a pneumatic line, or the like.

The first actuator 804 can be supported by a base 820. The base 820 can be a part of a vehicle, building, wheel chair, tractor, equipment, crate, or the like. A first pin 81 can connect the first actuator 804 with the base 820. The first pin 81 can allow the first actuator 804 to pivot thereabout.

A second actuator 815 can have a second rod 816 connected with the first actuator 804. The second actuator 815 can be supported by the base 820. The second actuator can be in communication with the power source or an additional power source via a second communication line 826.

The second actuator 815 can be a hydraulic actuator, a solenoid, a pneumatic actuator, or the like. The power system can be an electric power source, a pneumatic system, a hydraulic system, or the like. The second communication line 826 can be a hydraulic line, an electric conductor, a pneumatic line, or the like.

The second actuator 815 can be supported by the base 820. A second pin 822 can connect the second actuator 815 with the base 820. The second pin 822 can allow the second actuator 815 to pivot thereabout.

The first actuator 804 can be selectively operated to expand the expandable assembly 17 or retract the expandable assembly 17. For example, the first rod 805 can be extended to expand the expandable assembly or retracted to retract the expandable assembly 17.

The second actuator 815 can be selectively operated to move the position of the first actuator 804 to reorient the tool 110. For example, the second actuator 815 can be operated to move the tool 110 left and right if mounted horizontally or up and down if mounted vertically.

In one or more embodiments, an additional actuator can be attached to the tool 110. The additional actuator can provide movement of the tool in a direction that is additional to the second actuator 815. For example, the second actuator 815 can move the tool left and right, and the additional actuator can move the tool up and down.

Figure 11:
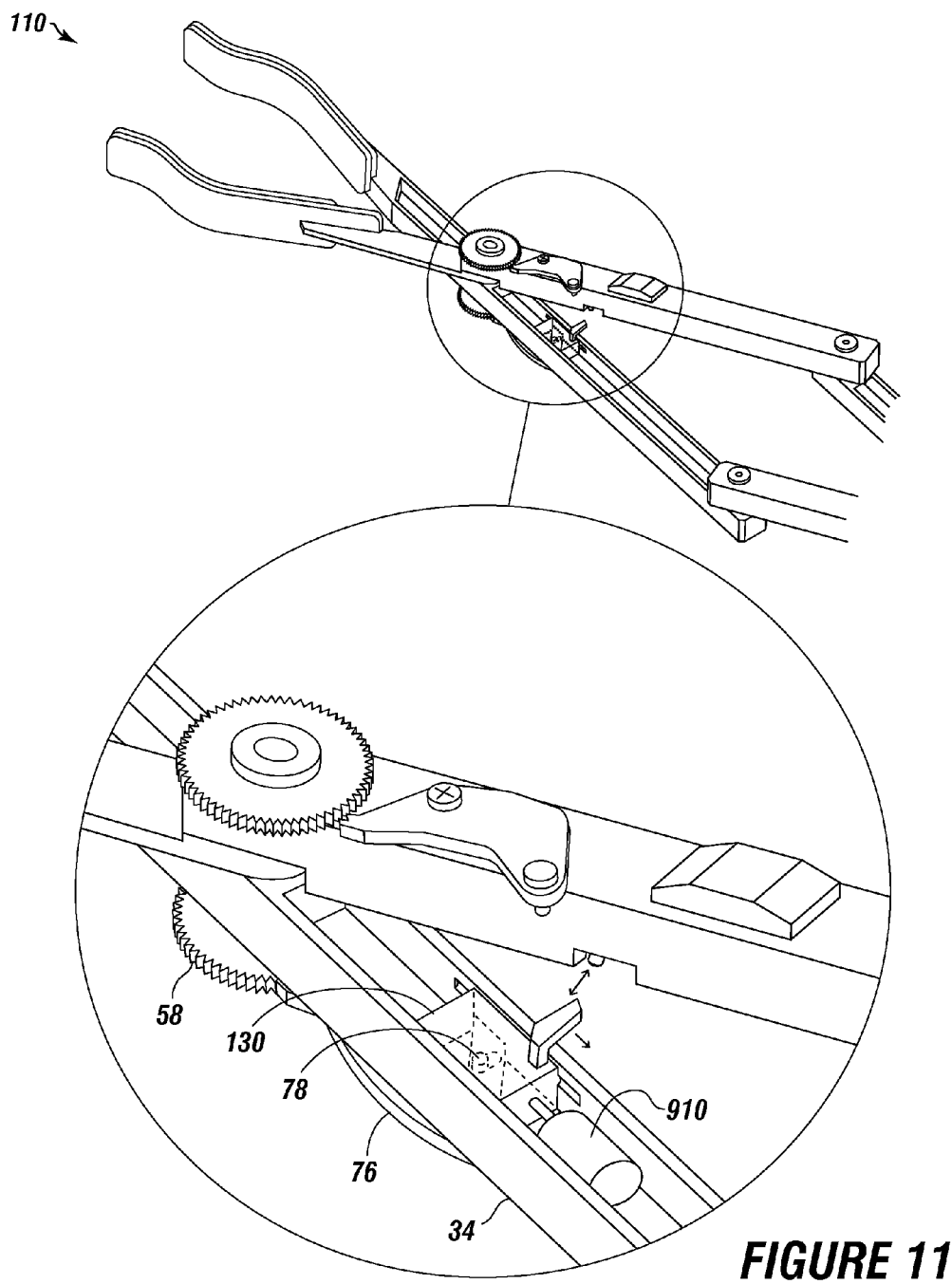
FIG. 11 depicts a release actuator in contact with the release ratchet.

FIG. 11 depicts a release actuator in contact with the release ratchet.

The release actuator 910 can be located on the seventh shaft 34. The release actuator can be arranged to contact the slide block 130. The release actuator can be operated to move the slide block 130 causing it to engage the first disengagement pin 78, thereby moving the release ratchet 76 away from the first gear 58. The release actuator 910 can be selectively operated to move the slide block 130 away from the first disengagement pin 78 allowing the release ratchet to engage the first gear 58. Consequently, the release actuator 910 can be used to release an object being held by the tool 110 even when the expandable assembly is extended.

The release actuator 910 can be a solenoid, a pneumatic actuator, a hydraulic actuator, or the like. The release actuator can be in communication with the power source or an additional power source via a third communication line.

In one or more embodiments, the drive ratchet can be operated by a drive ratchet actuator.

In one or more embodiments, an additional solenoid can be added to the forward edge of the seventh shaft adjacent the spur gear. The solenoid can engage the spur gear 58 by means of a specialized bracket to move the retaining arm open or closed.

In one or more embodiments, the tool can be configured to extend out and grasp an object and retract holding the object and then release the object once retracted. In this embodiment, the tool can use the gear assembly including both spur gears and both the release ratchet and the drive ratchet, but the tool does not need the carriage block, switch pin, fasteners, selector switch, switch spring, disengagement pin, swivel, retainer plate, a slide block, a contact arm, a pin, nor a wedge.

While these embodiments have been described with emphasis on the embodiments, it should be understood that within the scope of the appended claims, the embodiments might be practiced other than as specifically described herein.

What is claimed is:

1. A tool configured to grasp an object and either expand or retract while holding the object, the tool comprising:
    a. an expandable assembly configured to expand and retract; and
    b. a gear assembly disposed on a second end of the expandable assembly, wherein the gear assembly is configured to move a first retaining arm towards a second retaining arm as the expandable assembly expands, wherein the gear assembly comprises a first gear in selective contact with a release ratchet and adapted to rotate in a first direction when in contact with the release ratchet, and a second gear in contact with a drive ratchet, wherein the drive ratchet is configured to move the first retaining arm towards the second retaining arm as the expandable assembly is expanded.

2. The tool of claim 1, wherein the gear assembly is configured to allow the first retaining arm to remain in a locked position when the expandable assembly is retracted.

3. The tool of claim 1, wherein the expandable assembly comprises an expandable body with a plurality of shafts comprising:
    a. a shaft connected to a handle of a pair of handles;
    b. an additional shaft connected to another handle of the pair of handles;
    c. another shaft pinned to the first retaining arm by at least a portion of the gear assembly; and
    d. a top shaft connected to the second retaining arm, wherein each shaft of the plurality of shafts is connected to at least one of the other shafts of the plurality of shafts.

4. The tool of claim 1, further comprising a switch having a first switch position and a second switch position.

5. The tool of claim 1, further comprising a gear shaft disposed through the second end of the expandable assembly, the first gear, the second gear, and the first retaining arm.

6. The tool of claim 1, further comprising a plurality of spring locks disposed within a portion of a first end of the expandable assembly.

7. The tool of claim 1, further comprising an actuation device connected with the expandable assembly.

8. The tool of claim 1, wherein the expandable assembly is expanded and retracted with a first hydraulic actuator connected at an end of the expandable assembly opposite the gear assembly.

9. The tool of claim 8, further comprising a second hydraulic actuator for moving the expandable assembly.

10. The tool of claim 1, further comprising a release actuator operatively aligned with the release ratchet.

* * * * *